United States Patent Office 3,484,336
Patented Dec. 16, 1969

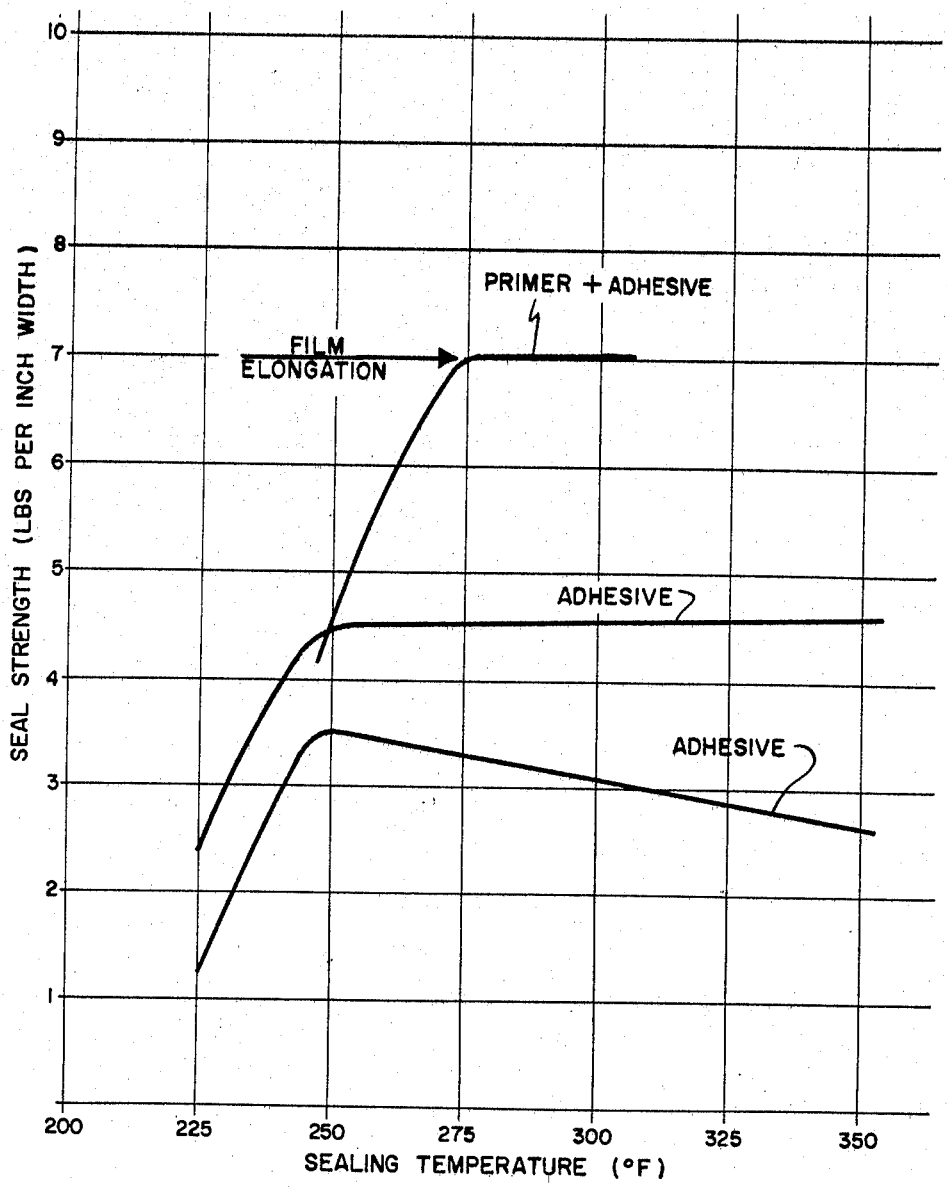

3,484,336
ADHESIVE COATING RECEPTIVE PRIMER
FOR INERT PLASTIC
Robert F. Aulik, Newark, and Norman M. Cassie, Cedar Grove, N.J., assignors to Armour and Company, Chicago, Ill., a corporation of Delaware
Filed Jan. 19, 1966, Ser. No. 521,638
Int. Cl. B32b 27/36
U.S. Cl. 161—184                     5 Claims

ABSTRACT OF THE DISCLOSURE

An inert plastic is primed for subsequent adhesion to itself and other substrates by applying a polyamide resin and an epoxy resin admixture in a solvent to said plastic, and drying so that it will receive an adhesive coating more readily thereon.

---

This invention relates to the heat sealing of inert plastic structures such as polyfluorocarbon or polyester film, sheet, board and the like, and more particularly to a novel adhesive primer composition for, a novel plastic blank for receiving an adhesive composition, to a novel adhesive coated inert plastic blank and a novel heat seal of said inert plastic.

The exceptional qualities of polyfluorocarbon and polyester plastics are well known. These plastics make exceptionally good packaging webs. The webs are strong, non-flammable, inert, boilable, selectively vapor permeable, have good slip, good clarity, good flexibility and have Food and Drug acceptance.

The inertness of each plastic has, however, retarded market acceptance as a packaging film because of the difficulty of adhering the plastic to itself or to other materials. Indeed, this is acknowledged in Modern Plastics Encyclopedia, September 1964, McGraw Hill, Inc., New York, N.Y., page 734, wherein it is stated that polyfluorocarbon plastics may only be bonded to themselves and other materials if pretreated or etched. Although several methods for applying a heat seal coating have been devised, none have been completely satisfactory.

One method has been to extrude a thin film of polyethylene onto the surface of the polyfluorocarbon, or polyester, substrate. For example, if the substrate is film, the film may then be folded upon itself with the polyethylene surface on the inside. Then, when heat and pressure are applied to the edges the polyethylene, but not the polyfluorocarbon or polyester substrate, melts and a pouch is formed. Such a polyethylene heat seal coat, however, is poorly adherable to the base, sometimes becoming a so-called "leaker" because the heat seal fails to provide a good bond, probably between the polyethylene and the substrate film even though both faces of polyethylene have been melted into one. The heat seal is also not sufficiently impervious to alcohols which frequently comprise a component of the packaged item such as food. Furthermore, the seal is not effective on or around powder or dust. This confines the laminate to the packaging of solids, such as tablets.

In addition to extruded polyethylene as the adhesive, other compositions, known as "hot melts," have also been used. But such usage has not met with complete commercial success because the hot melts are very viscous, and require very high heats during application. Also, their high viscosities force the use of thicker films than desired for economy reasons.

In the Modern Plastics Encyclopedia, the use of epoxy adhesives for fluorocarbons is mentioned, but with the limitation that the "joint strength is only moderate." This is not satisfactory for certain sealing, such as in pouch making, and specifically, boilable pouches where the drastic conditions encountered create havoc with the polyester seal.

In a very recent development, a novel heat seal composition for inert plastics has been devised. It broadly comprises a mixture of a thermoplastic copolymer, an ester of a polyol and wax, all dissolved in a solvent and applied to the inert substrate. One specific example of such a composition is a copolymer of vinyl acetate and ethylene, a rosin ester of pentaerythritol, paraffin wax, all dissolved in toluene. The solvent solution is applied to the inert substrate and allowed to dry. Subsequently, it is capable of being heat sealed to a similar substrate. Uniquely the heat seal is effective even when applied to shrinkable plastic. The adhesive composition seems to shrink, at the same rate, as the shrinkable plastic to which it is applied. This allows such shrinkable bags to be heat sealed into open pouches, filled with product, air evacuated, heat sealed at the open end, and lastly shrunk onto the product by application of heat (as by dipping into a hot liquid for a very short time). While the exact mechanism involved in attaining the successful heat-sealable bond with the aforementioned inert substances or with the shrinkable substances is indicated as not being understood, it is opined as that of a better wetting by the solvent. The improved wetting probably causes a better blending of the adhesive into the substrate so that a more positive bond occurs. This same hypothesis appears to be equally applicable to shrinkable plastic wherein the improved wetting causes better adhesion of the hot melt composition onto the substrate.

Nevertheless efforts still are being expended to further improve the heat sealability of such inert plastics and hopefully the shrinkable inert plastics.

An object of this invention is to provide a novel primer composition for use with heat seal compositions for inert plastics, such as the polyfluorocarbon plastics, the polyester plastics, and the like.

Another object is to provide a primer composition which promotes enhanced package sealing.

Another object is to provide a novel method for the application of said primer and said adhesive composition.

Still another object is to provide a novel heat sealed inert plastic structure.

A further object is to provide a primer and an adhesive composition and method which is easily applied.

In the drawing, Graph I shows the synergistic bond achieved with the primer and adhesive composition.

It has now been found that the application of a primer composition comprising a thermosetting resin and a solvent beneath the heat seal composition discussed above will synergize the strength of the heat seal type bond that is eventually made. For some unknow reason, the thermosetting resin (a mixture of polyamide and epoxy resin) and the solvent effects a better "bite" or anchorage into the film by the subsequently applied solvent dissolved hot melt adhesive composition. It could be that a better blending of the primer into the inert plastic occurs due to its use of a thermosetting resin somewhat like the composition of the substrate as well as the heat seal adhesive composition.

Usually the resin mixture of the primer composition involves an approximate 2 to 1 ratio of polyamide to epoxy resin, although ratio ranges of 3 to 1 to 1 to 1 are effective. The resin mixture is preferably applied at a solids content of 15%, although this can be raised to suit the requirements of the equipment and the amount desired for coating. Solid contents varying from 10 to 40% are effective. Warming the solution allows for progressively higher solids attainable yielding coatings of higher gauges.

The solvent comprises an aliphatic or aromatic hydrocarbon or mixture of both such as heptane, hexane, octane, benzene, toluene, xylol and methyl ethyl ketone and mixtures thereof.

The coating gauge of the primer varies from .0001 to .0010 inch with the preferred being .00015 inch.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

The invention is now described by reference to specific examples which best illustrate the advance made.

EXAMPLE I

A primer composition consisting of:

| | Solids | Grams |
|---|---|---|
| Toluol | | 50.00 |
| Versamid 400 (a polyamide resin of General Mills, Minneapolis, Minn.) | 30.00 | 50.00 |
| MEK (methyl ethyl ketone) | | 50.00 |
| Cab-O-Sil (a hydrophyllic fumed silicate of The Cabot Company, Boston, Mass. | 0.45 | 0.45 |
| Epon 1001-80 (an epoxy resin of Shell Chemical Company, Emeryville, Calif.) | 16.00 | 20.00 |
| | 46.45 | 170.45 | is formulated and applied via a roll applicator as a base (primer) coat on ½ mil type 33C Aclar film (a polyfluorochloroalkyl film as manufactured by Allied Chemical Company of New York, N.Y.). It is dried in 10 minutes using an oven maintained at 250° F. The resultant primed film may be used for the manufacture of boilable pouches, as will be disclosed below.

EXAMPLE II

Another primer composition consisting of:

| | Solids | Grams |
|---|---|---|
| Toluol | | 156.00 |
| Versamid 400 | 30.00 | 50.00 |
| MEK | | 80.00 |
| Epon 1001-80 | 16.00 | 20.00 |
| | 46.00 | 306.00 | may be formulated and applied via a roll applicator as a primer coat on 1 mil type 22C Aclar film. It is dried in 5 minutes using an oven maintained at 220–230° F.

EXAMPLE III

Another primer composition of:

| | Grams |
|---|---|
| Toluol | 78.00 |
| Versamid 400 | 25.00 |
| MEK | 40.00 |
| Epon 1001-80 | 10.00 |
| DETA (diethylenetriamine) | 0.80 |
| | 153.80 | can be formulated and applied as in Example II but with an increased drying temperature of 240–250° F.

EXAMPLE IV

Still another primer composition can be made of:

| | Grams |
|---|---|
| Epi Rez 520 (an epoxy resin of the glycidyl ether type by Jones-Dabney Company, Louisville, Ky.) | 22.00 |
| MEK | 100.00 |
| Versamid 115 | 5.00 |
| DETA | 0.10 |
| | 127.10 | and applied to the same film as in Example III in the same manner.

EXAMPLE V

Another primer composition may comprise:

| | Grams |
|---|---|
| Toluol | 78.00 |
| Versamid 400 | 22.50 |
| MEK | 27.50 |
| Epon 1001-80 | 10.00 |
| | 138.00 |

EXAMPLE VI

Still another primer composition may comprise:

| | Solids | Grams |
|---|---|---|
| Toluol | | 80.00 |
| Versamid 400 | 15.00 | 25.00 |
| MEK | | 68.00 |
| Epon 1001-80 | 13.60 | 17.00 |
| | 28.60 | 190.00 |

The primer compositions of Examples I to VI and the films coated therewith when coated with a heat seal composition will reveal exceptional bond strength even under boiling water conditions. Example VII, which follows, illustrates a typical instance of such enhanced bonding.

EXAMPLE VII

In accordance with the most recent development in this field of heat sealing inert plastic, and to prove the superiority of the primer composition of this invention, a heat seal composition is made consisting of:

20 parts of vinyl acetate—ethylene copolymer such as Elvax 40 marketed by E. I. du Pont de Nemours of Wilmington, Del.

20 parts of a vinyl acetate—ethylene copolymer such as Elvax 220 marketed by E. I. du Pont de Nemours of Wilmington, Del.

40 parts of an ester of pentaerythritol and hydrogenated rosin such as Pentalyn A marketed by Hercules Powder Co. of Wilmington, Del.

20 parts of paraffin wax melting at 133–135° C. such as Essowax marketed by Standard Oil Company of New Jersey the components are added to 233 parts of toluene and applied via an applicator roll to one face each of two equally dimensioned rectangular sheets of the primed Aclar film. The coated side of the sheets are then placed in an abutting relationship and a heated platen, having a heat of 150° F. and pressure of 20 lbs. per square inch, is then pressed upon three of the edges to form an open ended pouch.

When samples of the sealed pouch are subjected to testing procedures a synergistic bond strength will be found. Graph I, attached, illustrates such synergism.

The primer composition of this invention in its broadest aspects may comprise:

15 to 45 parts of a polyamide resin such as Versamid manufactured by General Mills of Minneapolis, Minn., 8 to 24 parts of an epoxy resin, such as an epoxide type like Epon resin manufactured by Shell Chemical Company of Emeryville, Calif. or glycidyl ether type like Epi-Rez (200 to 2000 epoxy equivalents) manufactured by Jones-Dabney of Louisville, Ky.; and 77 to 31 parts organic solvent such as heptane, hexane, octane, benzene, toluene, xylol, and methyl ethyl ketone.

The substrate to which the above primer composition may be applied may comprise films, sheets, fabrics, webs or structures of the inert materials comprising polychlorotrifluoroethylene, polytetrafluoroethylene, polyvinylfluoride, polyvinylidene fluoride, polyethylene, polypropylene, polyamide, polyester, copolyester, and the like or the heat shrinkable materials comprising polyvinylidene chloride, polyvinylchloride, polyethylene, polypropylene, and the more recent heat shrinkable polyesters and polyamides.

The composition may be applied to the substrate by any of the well-known means such as roll applicator, brush, flow-on, dip, spray or the like.

After application, the composition is dried by heat, In the customary manner, the primer coated film is passed through an oven, or a heating tower or other customary approaches. The heat of drying may range from 200 to 300° F., keeping in mind that the machine speed and oven temperature should be regulated so that the time-temperature limits of the heat-shrinkable films are not exceeded, thereby causing premature shrinkage of such heat shrinkable films.

It will thus be seen that the objects set forth above, among those made apparent from the preceding description, are efficiently attained and, since certain changes may be made in carrying out the above method and in the composition set forth without departing from the scope of the invention, it is intended that all matter contained in the above description shall be interpreted as illustrative and not in a limiting sense.

What is claimed is:

1. A laminate comprising at least one inert plastic sheet and a substrate with an integral layer of a primer of a polyamide resin and an epoxy resin admixture in a parts by weight ratio of 3-1 to 1-1, adjacent said plastic sheet, and an integral layer adjacent said primer layer of a heat sealable adhesive of 80 to 100 parts of a copolymer of vinyl acetate and ethylene, 5 to 10 parts of an ester of pentaerythritol and hydrogenated rosin acid and 1 to 5 parts of a low melting wax.

2. The laminate of claim 1 wherein said inert plastic comprises a polyfluorocarbon plastic and said substrate also comprises a polyfluorocarbon plastic.

3. The laminate of claim 1 wherein said inert plastic comprises a polyester plastic and said substrate also comprises a polyester plastic.

4. A method of heat sealing inert plastics to themselves and to other plastics comprising the steps of dissolving in an organic solvent a primer composition comprising a polyamide resin and an epoxy resin admixture, then applying the resultant solution to said inert plastic, drying said solution, subsequently applying a solvent solution of an adhesive composition comprising a thermoplastic copolymer selected from the group consisting of vinyl acetate and ethylene, vinyl acrylate and ethylene, and vinyl acetate and propylene, an ester formed by the reaction of a polyol selected from the group consisting of pentaerythritol and glycerol, and an acid selected from the group consisting of rosin, terpene, polyterpene and dimerized resin acids and a wax, then drying said solution of adhesive and subsequently heat sealing the primer and heat seal coated plastic to another substrate.

5. The method of claim 4 wherein the polyamide resin and epoxy resin admixture is in a parts by weight ratio of 3-1 to 1-1, and wherein the solution applied to said inert plastic is in a coat thickness of .0001 to .001 inch.

References Cited

UNITED STATES PATENTS

| | | | |
|---|---|---|---|
| 2,490,550 | 12/1949 | Sermattei | 260—28.5 X |
| 3,025,167 | 3/1962 | Butler. | |
| 3,232,895 | 2/1966 | Klein et al. | 260—28.5 X |
| 2,705,223 | 3/1955 | Renfrew et al. | 260—18 |
| 3,008,848 | 11/1961 | Annonio | 117—72 |
| 3,032,460 | 5/1962 | Chipman et al. | 156—330 X |
| 3,164,488 | 1/1965 | Workman | 260—18 X |
| 3,256,228 | 6/1966 | Tyran | 117—138.8 X |

OTHER REFERENCES

Renfrew, M. M., Wittcoff, Harold, Floyd, Don, and Glaser, D. W., "Coatings of Polyamide and Epoxy Resin Blends," Industrial and Engineering Chemistry, vol 46 (October 1954), pp. 2226–2232 (copy in scientific library).

HAROLD ANSHER, Primary Examiner

R. A. KILLWORTH, Assistant Examiner

U.S. Cl. X.R.

156—315, 330, 331, 334; 161—189, 227, 231